UNITED STATES PATENT OFFICE.

AMOR SMITH, OF CINCINNATI, OHIO, ASSIGNOR TO AMOR SMITH & CO., OF SAME PLACE.

IMPROVEMENT IN PROCESSES OF EXTRACTING OLEOMARGARINE FROM ANIMAL FATS.

Specification forming part of Letters Patent No. 188,428, dated March 13, 1877; application filed February 17, 1877.

*To all whom it may concern:*

Be it known that I, AMOR SMITH, of Cincinnati, Hamilton county, Ohio, have invented a new and Improved Process of Extracting Oleomargarine from Animal Fats, of which the following is a specification:

Heretofore oleine and oleomargarine have been separated from beef-fats by various processes, the most common being to first heat the fat to such a point (generally from 125° to 130° Fahrenheit) that the tissues or membrane separate from it, and sink in its containing-vessel, allowing the pure fat to come to the surface, and this, after being taken off and allowed to cool, is separated into its component parts by extracting the oleomargarine from the stearine at a lower temperature.

This process has the following objections: It requires much time, as the fat, after having been heated, has to be allowed to cool before being worked. It requires two distinct operations after the fat is purified and disintegrated.

But the greatest objection is, the oleomargarine produced in this way, owing to the high temperature required to separate the membrane, retains more or less of the tallow odor, which it is very desirable to prevent if the product is to be used for artificial butter— the most common use to which extracted oleine is put; for if the oleine has odor attaching to it when it is produced, it is difficult to remove it.

It is a fact well-known to chemists that the higher the degree of heat to which the fats are raised in working the stronger will be the odor following the product. Therefore, when fats are heated to 125° Fahrenheit to allow the membrane to be separated from the combined stearine, oleine, and margarine, it is difficult to prevent a slight odor from attaching to the product.

To overcome these difficulties I have invented a process for separating the oleine or oleomargarine from the other parts of animal fats much more simple than, and proceeding on different principles from, those before known.

The raw fat as it comes from the beef is first purified and thoroughly macerated by any suitable means. For this purpose I prefer a method for which I have applied for a patent of even date herewith.

The cells or little sacs of fat being thoroughly broken up, it is placed in a vessel containing ordinary salt-pickle, where the whole mass—tissue, membrane, stearine, oleine, &c., in its natural state, except that it has been broken up—is warmed, preferably by steam, to a temperature of about 85° Fahrenheit to 100° Fahrenheit. I prefer the degrees of from 90° to 95°, as between these points more oleine is extracted than at lower degrees, and the heat is not enough to melt the stearine, that requiring a heat of over 100° Fahrenheit.

Excellent work can be done under my process anywhere between the degrees 80° and 100° Fahrenheit, and I contemplate using any degrees that will melt the oleine and not melt the stearine.

The fat having been thus ⸺ᵈ, it is placed in cloths, and the oleomarg⸺ that has been liberated from the rest of tn⸺ ⸺ss by the warmth is pressed out by any suitable press, leaving the stearine and membrane, as to separate the membrane requires a higher degree of heat, which cannot be used without attaching more or less odor to the oleine.

The room in which the pressure takes place should be kept at a temperature substantially the same as that to which the material has been warmed.

I am aware that oleomargarine has been extracted by first heating the whole mass to a temperature of from 100° to 125° Fahrenheit, constantly stirring it, and after the membrane has been thus liberated from the stearine and oleomargarine, allowing these parts to cool to a point at which the oleomargarine can be separated from the stearine. This requires two processes, and higher heating than I employ, as I use but one process, and extract the oleomargarine directly from the stearine and membrane at a temperature at which the stearine does not melt without heating above this point.

I claim—

The within-described method of separating oleomargarine from the fat of kine—that is to say, by separating it directly from the stearine and membrane at a low heat, without having first heated the mass to a higher point, for the purpose of removing the membrane from the stearine and oleine.

AMOR SMITH.

Witnesses:
 JEREMIAH F. TWOHIG,
 WM. M. S. BATES.